United States Patent
Bhandari et al.

(10) Patent No.: US 12,163,595 B2
(45) Date of Patent: Dec. 10, 2024

(54) FUEL TANK ISOLATION VALVE WITH INTERMEDIATE POSITION LATCHING FOR SINGLE OPERATION

(71) Applicant: PADMINI VNA MECHATRONICS PVT. LTD., Gurgaon (IN)

(72) Inventors: Kabir Bhandari, Gurgaon (IN); Amardip Kumar, Gurgaon (IN); Varun Kumar, Gurgaon (IN); Sahil Singla, Gurgaon (IN)

(73) Assignee: PADMINI VNA MECHATRONICS LTD. (IN)

( * ) Notice: Subject to any disclaimer, the term of this patent is extended or adjusted under 35 U.S.C. 154(b) by 32 days.

(21) Appl. No.: 18/001,073

(22) PCT Filed: Jun. 8, 2021

(86) PCT No.: PCT/IB2021/055045
§ 371 (c)(1),
(2) Date: Dec. 8, 2022

(87) PCT Pub. No.: WO2021/250575
PCT Pub. Date: Dec. 16, 2021

(65) Prior Publication Data
US 2023/0213105 A1    Jul. 6, 2023

(30) Foreign Application Priority Data
Jun. 8, 2020  (IN) .............................. 202011023927

(51) Int. Cl.
*F16K 31/10*    (2006.01)
*F16K 17/196*   (2006.01)

(52) U.S. Cl.
CPC ............ *F16K 17/196* (2013.01); *F16K 31/10* (2013.01)

(58) Field of Classification Search
CPC ........ B60K 15/03514; B60K 15/03519; B60K 2015/03302; F16K 31/10; F16K 17/196
See application file for complete search history.

(56) References Cited

U.S. PATENT DOCUMENTS

| | | | |
|---|---|---|---|
| 5,156,178 A * | 10/1992 | Harris ............... | B60K 15/03519 220/746 |
| 6,047,945 A * | 4/2000 | Grove .................. | F16K 31/004 310/330 |
| 8,028,970 B2 | 10/2011 | Fukano et al. | |
| 8,800,961 B2 * | 8/2014 | Miura .................... | F16K 27/029 251/363 |
| 9,631,583 B2 * | 4/2017 | Balsdon ........... | B60K 15/03519 |
| 9,777,678 B2 | 10/2017 | Dudar et al. | |
| 10,202,035 B2 * | 2/2019 | Ogiwara .......... | B60K 15/03519 |
| 11,242,823 B1 * | 2/2022 | Ryu .................... | F16K 31/0696 |
| 11,280,425 B2 * | 3/2022 | Kim .................... | F16K 31/0655 |

(Continued)

*Primary Examiner* — Umashankar Venkatesan

(57) ABSTRACT

The present invention provides an improved fuel tank isolation valve (10). In particular, the invention is directed to provide an improved fuel tank isolation valve (10) which is normally open for one time delivery condition of the valve to enable refuelling function at the time of vehicle assembly. Said valve (10) comprises of a valve housing (1) and a solenoid housing (2), wherein the solenoid housing (2) includes one latch assembly that locks the moving core (12) in radial or axial direction to provide an intermediate latching position for single operation.

13 Claims, 15 Drawing Sheets

(56) References Cited

U.S. PATENT DOCUMENTS

| | | | |
|---|---|---|---|
| 11,614,055 B2* | 3/2023 | Ryu | F16K 31/10 |
| | | | 123/519 |
| 2017/0107953 A1* | 4/2017 | Weldon | F02M 26/53 |
| 2019/0084410 A1 | 3/2019 | Krishan et al. | |
| 2019/0249793 A1* | 8/2019 | Freter | F16K 31/0655 |
| 2020/0378527 A1* | 12/2020 | Stephan | F16K 1/36 |
| 2022/0325813 A1* | 10/2022 | Bhandari | F16K 24/04 |

* cited by examiner

FUEL TANK ISOLATION VALVE WITH INTERMEDIATE POSITION LATCHING FOR SINGLE OPERATION

FIELD OF THE INVENTION

The present invention relates to a fuel tank isolation valve. More specifically, the invention provides an improved fuel tank isolation valve with intermediate position latching for single operation.

BACKGROUND OF THE INVENTION

A fuel tank isolation valve (FTIV) is usually located in a conduit between a fuel tank and a fuel vapor canister in an evaporative emission control system. It is highly useful in vehicles having pressurized tank system, where there is a need of valve that is capable of maintaining pressure inside the tank in a protected pressure range either in an over pressure condition or in an under pressure condition i.e. over vacuum condition. It opens automatically when the pressure exceeds protection limits and valve is electrically actuated at the time of vehicle is re-fuelled.

A fuel tank isolation valve includes a housing sub-assembly accommodating an electrically controlled solenoid valve, a compression spring fixed inside the housing sub-assembly to perform over-vacuum relief function, a seal sub-assembly, a guiding shaft coupled with seal sub-assembly for inline guiding of flow limiter, a nozzle body which is mounted over housing sub-assembly to be connected to the fuel tank of the vehicle, a compression spring fixed over flow limiter to perform over-pressure relief function and a cover which will be mounted over nozzle body to be connected to the canister side of the vehicle. The main functions of a fuel tank isolation valve include maintaining the tank pressure within a protected pressure range, electrically controlling the flow of fuel vapours from tank to canister during refuelling, providing over pressure and over vacuum relief.

In the over pressure condition, the fuel vapour flow takes place from tank port to canister port of the vehicle whereas in the over vacuum condition, the fuel vapour flow takes place form the canister port to tank side of vehicle.

At the time of vehicle assembly there is a need of one time powerless opening of the valve to perform the refuelling since battery connections are not available at that time in the vehicle. Also, it is difficult to provide this one time powerless opening of the valve from the vehicle assembly line and the fuel tank isolation valve is normally closed i.e. closed in powerless condition.

Hence there is a technological gap and there is a need of a valve which can be partially opened to a fixed position depending upon requirement during one time delivery condition of valve to enable one time powerless opening of the valve for refuelling.

OBJECT OF THE INVENTION

The main object of the present invention is to provide an improved fuel tank isolation valve with intermediate position latching for single operation.

Yet another object of the present invention is to provide a valve with one time powerless opening to perform the refuelling at the time of vehicle assembly.

Still another object of the present invention is to provide fuel tank isolation valve which is normally open for one time at the delivery of valve and during vehicle assembly.

SUMMARY OF THE INVENTION

The present invention provides an improved fuel tank isolation valve. In particular, the invention is directed to provide an improved fuel tank isolation valve which is normally open for one time delivery condition of the valve to enable refuelling function at the time of vehicle assembly.

In an embodiment, the present invention provides an improved fuel tank isolation valve with intermediate position latching for single operation. Said improved fuel tank valve comprises of a valve housing and a solenoid housing, wherein the valve housing has a canister port, a tank port and is fitted over the solenoid housing, the valve housing includes a compression spring fixed inside the valve housing for performing OPR function, a seal sub assembly, a flow limiter, a sealing surface and a shaft; and the solenoid housing includes a solenoid, a moving core, a compression spring for performing OVR function. The shaft is assembled with seal sub-assembly for OPR function for inline guiding of the flow limiter. On the top end of the solenoid housing at least one latch assembly is connected to provide a one-time powerless opening to perform the refuelling at the time of vehicle assembly.

In another embodiment, the present invention provides the improved fuel tank isolation valve comprising of a valve housing and a solenoid housing, wherein on the top end of the solenoid housing a latch assembly is attached. Said latch assembly comprises of a torsional spring and a hinge that locks the moving core in axial direction to provide an intermediate latching position for single operation. The moving core is modified such that it has an extruded ring on its thin portion with an annular groove on its upper surface in which a protrusion provided at free end of the hinge gets engaged.

In yet another embodiment, the present invention provides the improved fuel tank isolation valve comprising of a valve housing and a solenoid housing, wherein on the top end of the solenoid housing a latch assembly is attached. Said latch assembly comprises of a torsional spring and a hinge that locks the moving core from radial direction to provide an intermediate latching position for single operation. The moving core is modified such that it has an extruded ring on its thin portion with an annular groove on its side surface in which a protrusion provided at free end of the hinge gets engaged. Alternatively, the moving core is modified such that an annular groove is provided on the moving core itself and the hinge is elongated such that protrusion at its free end gets engaged in the groove.

In yet another embodiment, the present invention provides the improved fuel tank isolation valve comprising of a valve housing and a solenoid housing, wherein on the top end of the solenoid housing a latch assembly is attached. Said latch assembly comprises of a compression spring, a cover and a hinge that locks the moving core in axial direction to provide an intermediate latching position for single operation. The moving core is modified such that it has an extruded ring on its thin portion with an annular groove on its upper surface in which a protrusion provided at free end of the hinge gets engaged using the compression spring and fitted with the cover. Alternatively, the moving core is modified such that an annular groove is provided on the moving core itself and the hinge is elongated such that protrusion at its free end gets engaged in the groove.

BRIEF DESCRIPTION OF THE DRAWINGS

The present invention will be described with reference to the following drawings.

The drawings and the associated descriptions are provided to illustrate embodiments of the invention and not to limit the scope of the invention.

DETAILED DESCRIPTION OF THE INVENTION

Figure 1A:
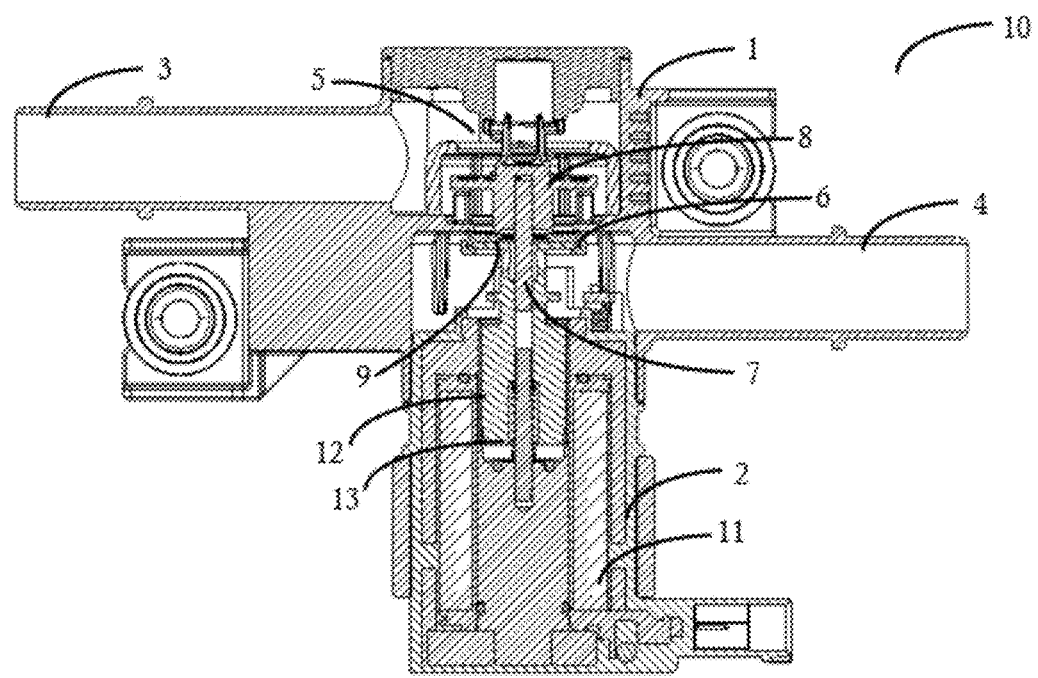
FIG. 1(a) is a sectional view the fuel tank isolation valve (FTIV) in accordance with an embodiment of the present invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

In an embodiment, the present invention provides an improved fuel tank isolation valve with intermediate position latching for single operation. Said improved fuel tank valve comprises of a valve housing and a solenoid housing, wherein the valve housing has a canister port, a tank port and is fitted over the solenoid housing, the valve housing includes a compression spring fixed inside the valve housing for performing OPR function, a seal sub assembly, a sealing surface for OVR function and refuelling, a flow limiter, a sealing surface for OPR function and a shaft; and the solenoid housing includes a solenoid, a moving core, a compression spring for performing OVR function. The shaft is assembled with seal sub-assembly for OPR function for inline guiding of the flow limiter. On the top end of the solenoid housing at least one latch assembly is connected to provide a one-time powerless opening to perform the refuelling at the time of vehicle assembly.

In another embodiment, the present invention provides the improved fuel tank isolation valve comprising of a valve housing and a solenoid housing, wherein on the top end of the solenoid housing a latch assembly is attached. Said latch assembly comprises of a torsional spring and a hinge that locks the moving core in axial direction to provide an intermediate latching position for single operation. The moving core is modified such that it has an extruded ring on its thin portion with an annular groove on its upper surface in which a protrusion provided at free end of the hinge gets engaged.

Here, on the top end of the solenoid housing, at least one protrusion is provided for assembly of torsional spring and hinge and at least one protrusion is provided that acts as a stopper for the hinge in the idle condition. The torsional spring and hinge is assembled to the solenoid housing in the idle condition i.e. hinge comes in contact with the stopper in idle condition. The torsional spring is inserted in protrusion provided on top of the solenoid housing and the hinge is mounted over it. The hinge is pressed against the torsional spring force and the valve is made powerless open such that the hinge and moving core snap lock with each other. In this condition, the moving core remains locked from going back to its original position and made to stop at the intermediate position keeping the valve partially open for one time delivery condition. After the FTIV is installed in the complete vehicle assembly and electrically actuated for the first time, the moving core moves downwards and the snap lock between moving core and the hinge is released. The hinge gets back to its original position due to torsional spring force and becomes non-functional.

In yet another embodiment, the present invention provides the improved fuel tank isolation valve comprising of a valve housing and a solenoid housing, wherein on the top end of the solenoid housing a latch assembly is attached. Said latch assembly comprises of a torsional spring and a hinge that locks the moving core from radial direction to provide an intermediate latching position for single operation. The moving core is modified such that it has an extruded ring on its thin portion with an annular groove on its side surface in which a protrusion provided at free end of the hinge gets engaged. Alternatively, the moving core is modified such that an annular groove is provided on the moving core itself and the hinge is elongated such that protrusion at its free end gets engaged in the groove.

Here, on the top end of the solenoid housing, at least one protrusion is provided for assembly of torsional spring and hinge and at least one protrusion is provided that acts as a stopper for the hinge in the idle condition. The torsional spring and hinge is assembled to the solenoid housing in the idle condition i.e. hinge comes in contact with the stopper in idle condition. The torsional spring is inserted in protrusion provided on top of the solenoid housing and the hinge is mounted over it. The hinge is pressed against the torsional spring force and the valve is made powerless open such that the hinge and moving core snap lock with each other. In this condition, the moving core remains locked from going back to its original position and made to stop at the intermediate position keeping the valve partially open for one time delivery condition. After the FTIV is installed in the complete vehicle assembly and electrically actuated for the first time, the moving core moves downwards and the snap lock between moving core and the hinge is released. The hinge gets back to its original position due to torsional spring force and becomes non-functional.

In yet another embodiment, the present invention provides the improved fuel tank isolation valve comprising of a valve housing and a solenoid housing, wherein on the top end of the solenoid housing a latch assembly is attached. Said latch assembly comprises of a compression spring, a cover and a hinge that locks the moving core in axial direction to provide an intermediate latching position for single operation. The moving core is modified such that it has an extruded ring on its thin portion with an annular groove on its upper surface in which a protrusion provided at free end of the hinge gets engaged using the compression spring and fitted with the cover.

Here, on the top end of the solenoid housing, at least one protrusion is provided for guided movement of hinge and the compression spring is assembled in between this protrusion with a cover on the top. Due to the compression spring force, the hinge remains at its original position. When the valve is actuated, the moving core moves downwards. In this condition, with help of an external tool, the hinge is pressed by compressing the spring and the valve is made powerless so that moving core and hinge snap lock with each other keeping the valve partially open for one time delivery condition and hence the valve becomes normally open for one-time delivery condition. After first actuation, the moving core moves downwards and the snap lock gets removed and the hinge becomes non-functional.

Now referring to FIG. 1(a), sectional view the fuel tank isolation valve (FTIV) 10 is shown comprising of a valve housing 1 and a solenoid housing 2, wherein the valve housing 1 has a canister port 3, a tank port 4 and is fitted over the solenoid housing 2, the valve housing 1 accommodates a compression spring 5 fixed inside the valve housing 1 for performing OPR function, a seal sub assembly 6, a plunger/shaft 7, a flow limiter 8, and a sealing surface 9 for OPR function; and the solenoid housing 2 accommodates a solenoid 11, a moving core 12, a compression spring 13 for performing OVR function. The plunger/shaft 7 is assembled with seal sub-assembly 6 for OPR function for inline guiding of the flow limiter 8. On the top end of the solenoid housing 2 at least one latch assembly is connected to provide a one-time powerless opening to perform the refuelling at the time of vehicle assembly.

Figure 1B:
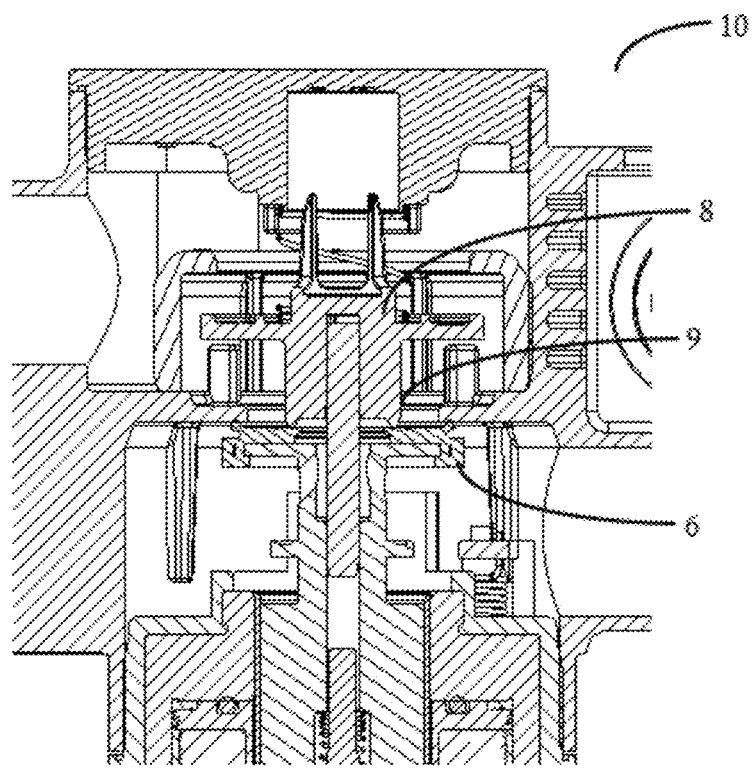
FIG. 1(b) shows and enlarged view of the fuel tank isolation valve (10) in accordance with the present invention.

FIG. 1(b) shows and enlarged view of the fuel tank isolation valve 10 in accordance with the present invention. The seal subassembly 6 is assembled such that when it is in contact with the flow limiter 8 it forms a sealing for OVR and refuelling function. Also, the seal sub assembly 6 gets in contact with a sealing surface 9 to form a sealing for OPR function.

Figure 2A:
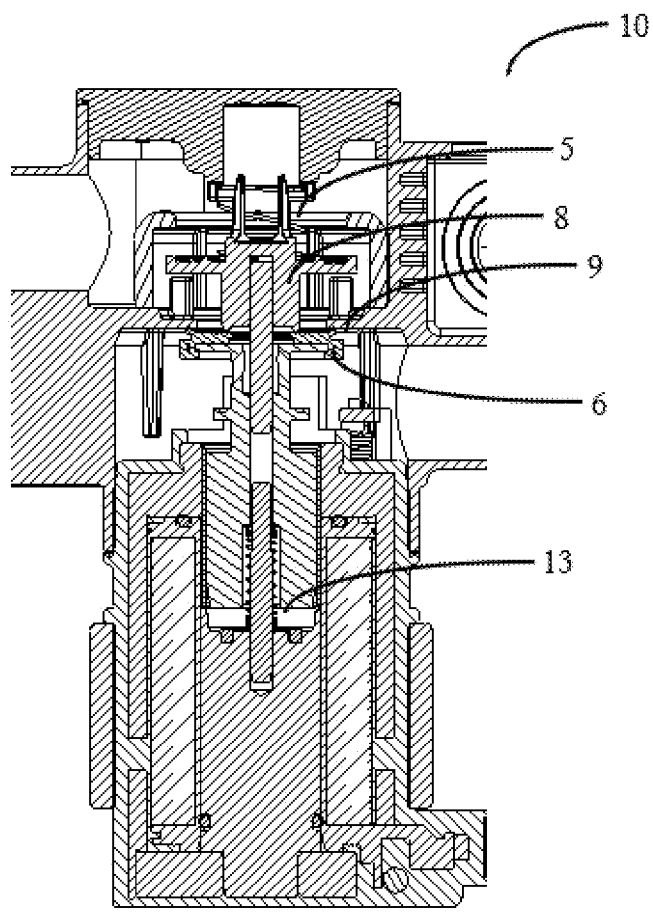
FIG. 2(a) and FIG. 2(b) show the cross-sectional view of the fuel tank isolation valve (10) in idle condition.
Figure 2B:
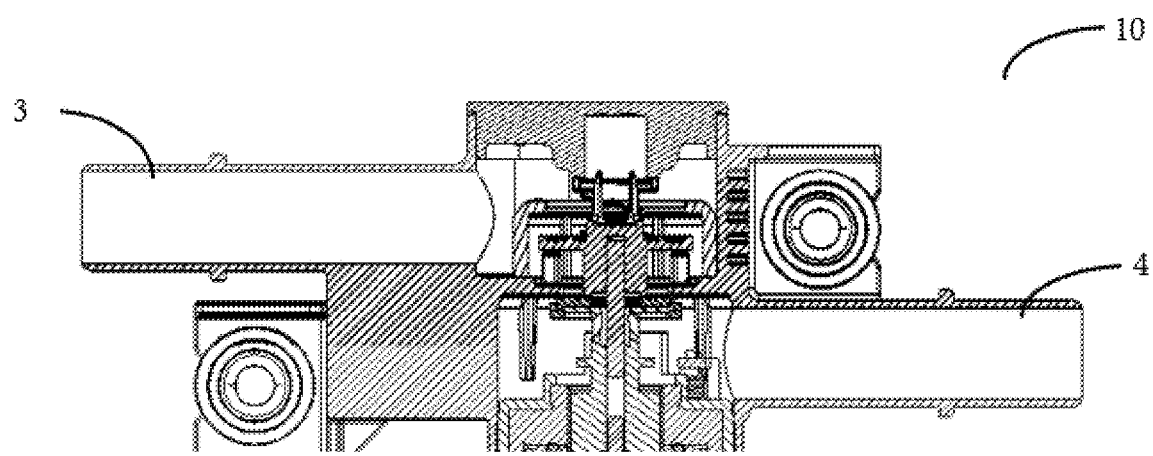

FIG. 2(a) and FIG. 2(b) show the cross-sectional view of the fuel tank isolation valve 10 in idle condition. Compression spring 13 for OVR function holds the seal sub assembly 6 in contact with the sealing surface 9 and the valve 10 remains closed. Compression spring 5 for OPR function keeps the flow limiter 8 downwards and attached to seal sub assembly 6. In the idle condition, both the openings are closed and the tank port 4 is not connected to the canister port 3 of the valve. The fuel vapours remain inside the fuel tank till the pressure inside the tank is within the safety limit.

Figure 3A:
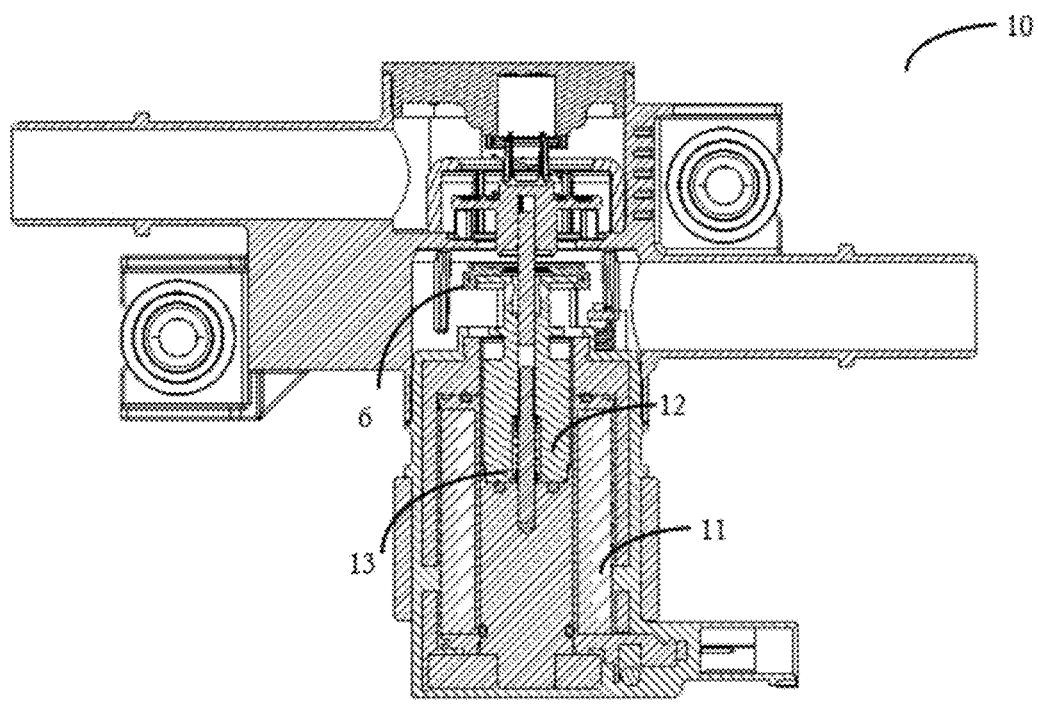
FIG. 3(a) and FIG. 3(b) show the cross-sectional view of the fuel tank isolation valve (10) in ON condition.
Figure 3B:
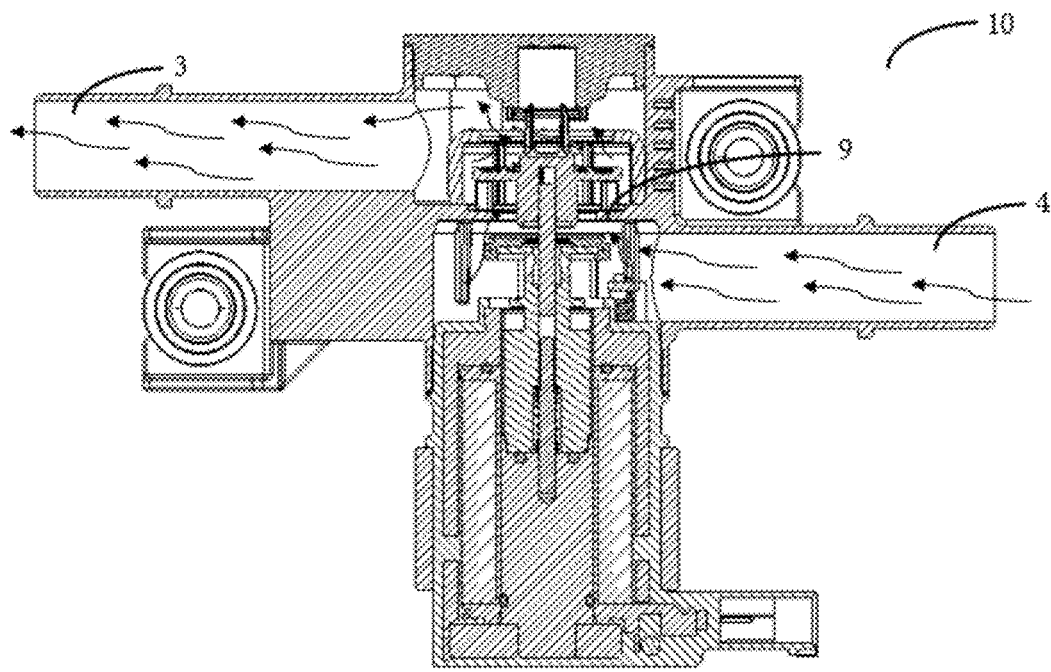

FIG. 3(a) and FIG. 3(b) show the cross-sectional view of the fuel tank isolation valve 10 in ON condition. In the ON condition, the solenoid 11 is turned ON and refuelling takes place. The magnetic field from solenoid 11 moves the moving core 12 downward causing the seal sub assembly 6 to open and sealing surface 9 remains at its position. In this condition, the force exerted by the moving core 12 due to the magnetic field is greater than force exerted by the compression spring 13 for OVR function. Hence, the moving core 12 moves downward and the seal sub assembly 6 detaches from sealing surface 9 and the port opens and connects the tank port 4 to canister port 3 at the time of actuation during refuelling.

Figure 4A:
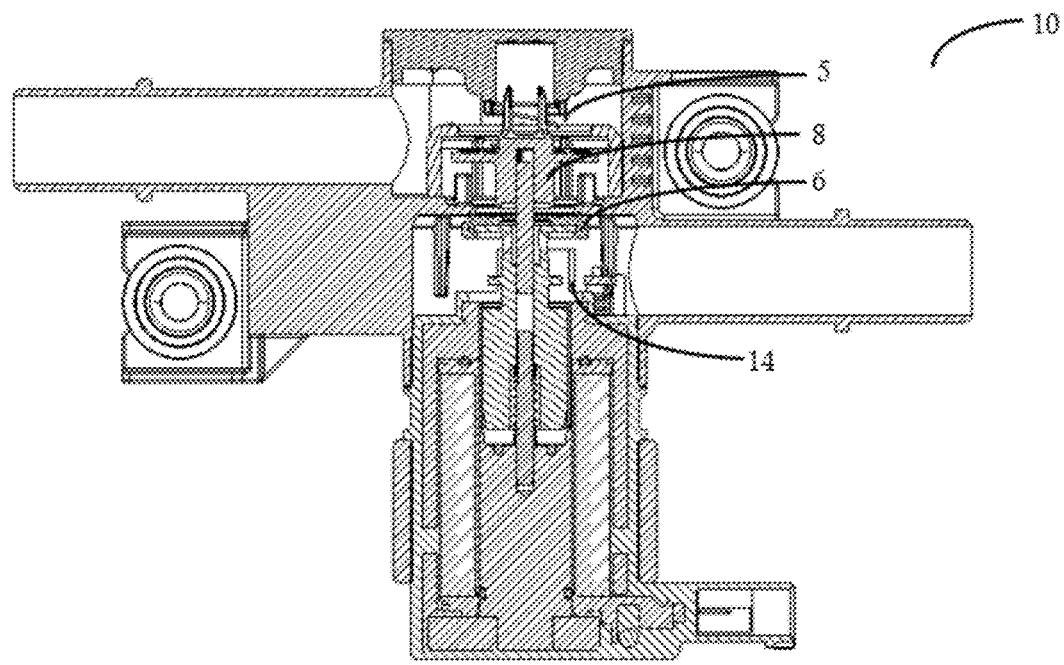
FIG. 4(a) and FIG. 4(b) show the cross-sectional view of the fuel tank isolation valve (10) in OPR condition.
Figure 4B:
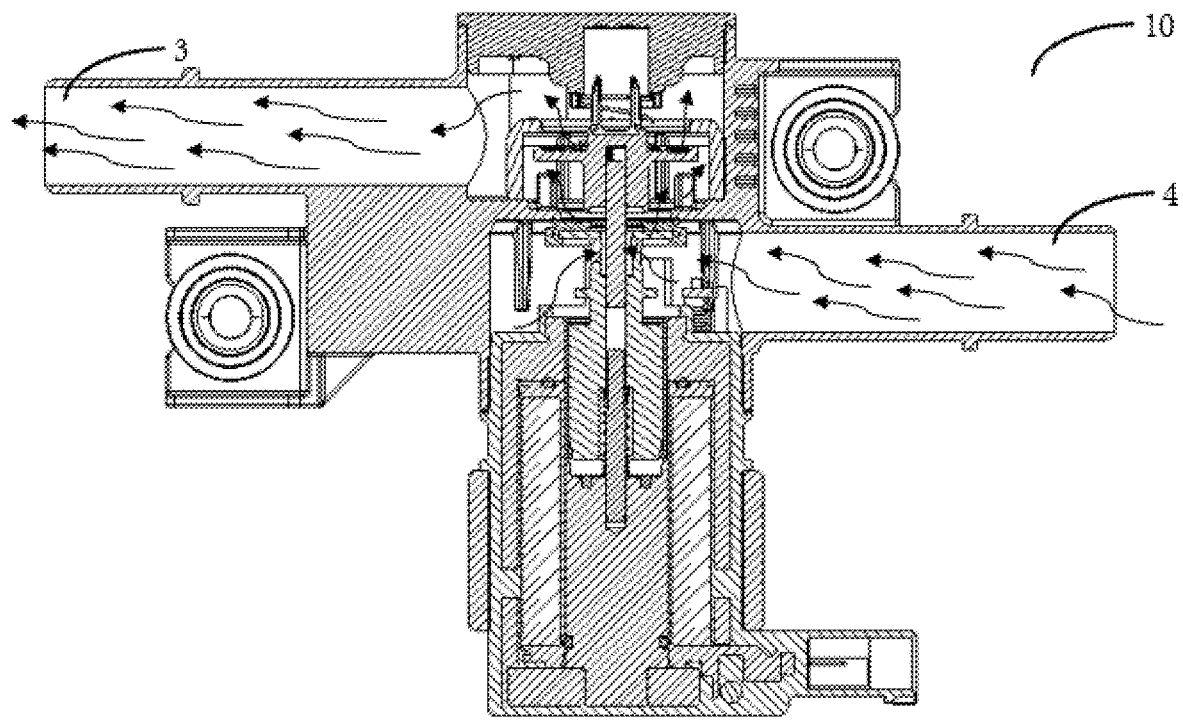

FIG. 4(a) and FIG. 4(b) show the cross-sectional view of the fuel tank isolation valve 10 in OPR condition. In the OPR condition, a pressure is built inside chamber 14 and the compression spring 5 for OPR function keeps the flow limiter 8 in contact with the sealing sub assembly 6 keeping the valve 10 in closed condition. When the pressure increases beyond the protection point limit, the force exerted by the increased pressure compresses the compression spring 5 for OPR function and lifts the flow limiter 8 upwards making the port open and allowing flow of fuel vapour from tank port 4 to canister port 3. During opening, excess fuel vapours go towards the canister port 3 and in the canister of the vehicle. Afterwards when the pressure comes down the safety limit, the port gets closed.

Figure 5A:
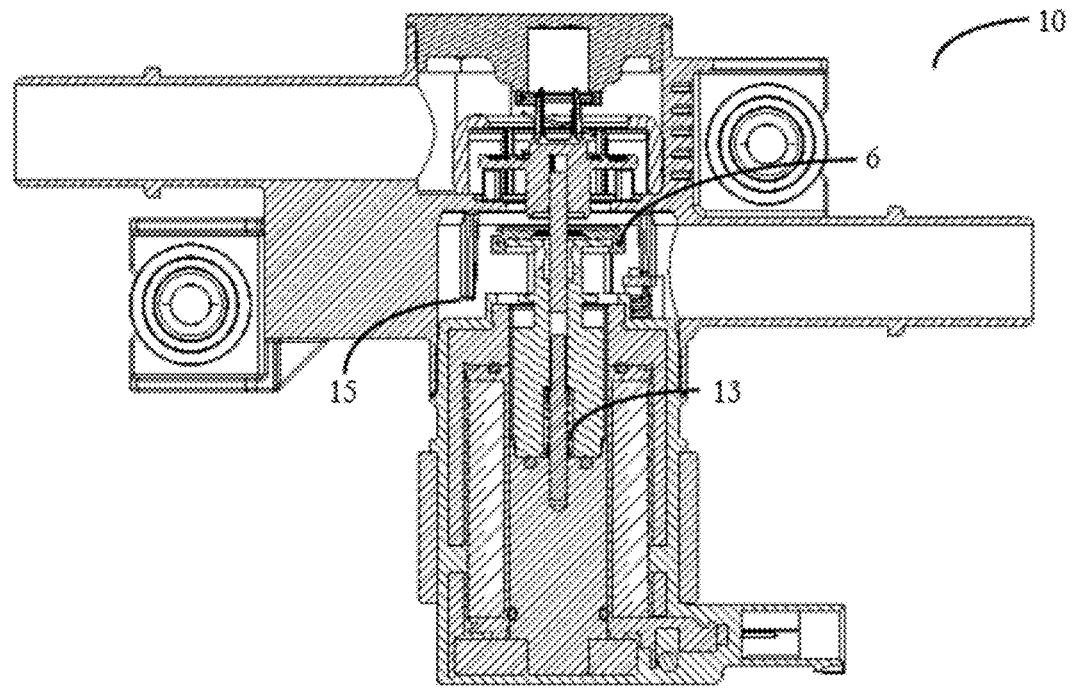
FIG. 5(a) and FIG. 5(b) show the cross-sectional view of the fuel tank isolation valve (10) in OVR condition.
Figure 5B:
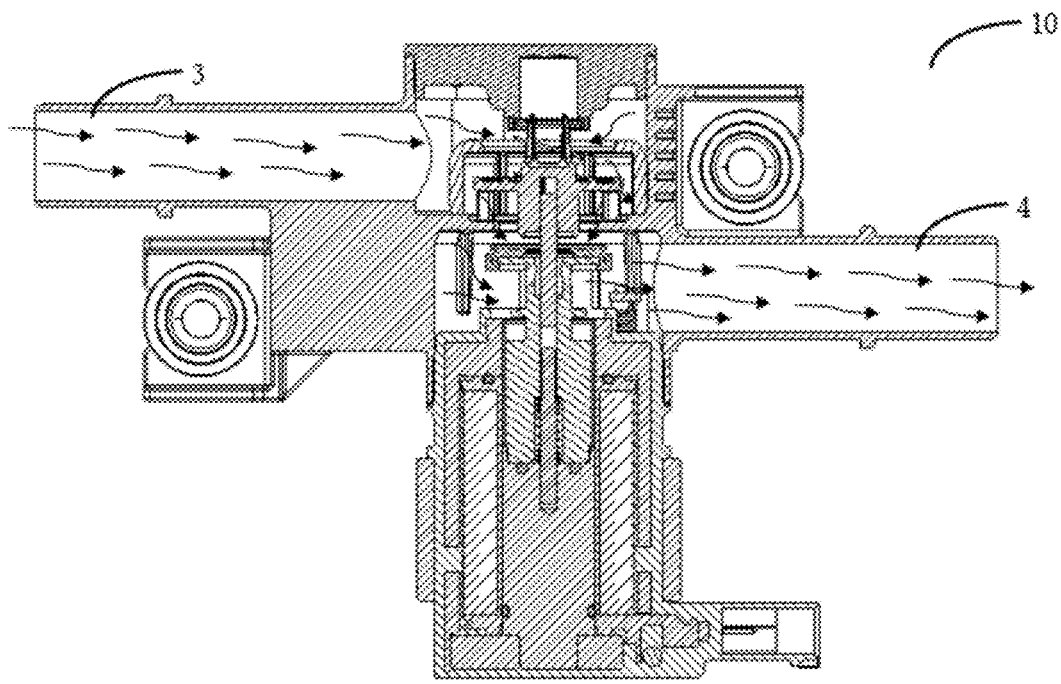

FIG. 5(a) and FIG. 5(b) show the cross-sectional view of the fuel tank isolation valve 10 in OVR condition. A vacuum is built inside the chamber 15 of the valve and compression spring 13 keeps the seal sub assembly 6 in contact with the sealing surface 9 keeping the valve 10 in closed condition. When the vacuum increases beyond the protection point limit, the force exerted by the increased vacuum compresses the compression spring 13 and the seal sub assembly 6 moves downwards. As the seal sub assembly 6 moves downwards, port opens and flow of fuel vapour takes place from canister port 3 to tank port 4. Due to the port opening, vacuum releases from the tank and as the vacuum level comes under the safety limit, the port closes.

Figure 6:
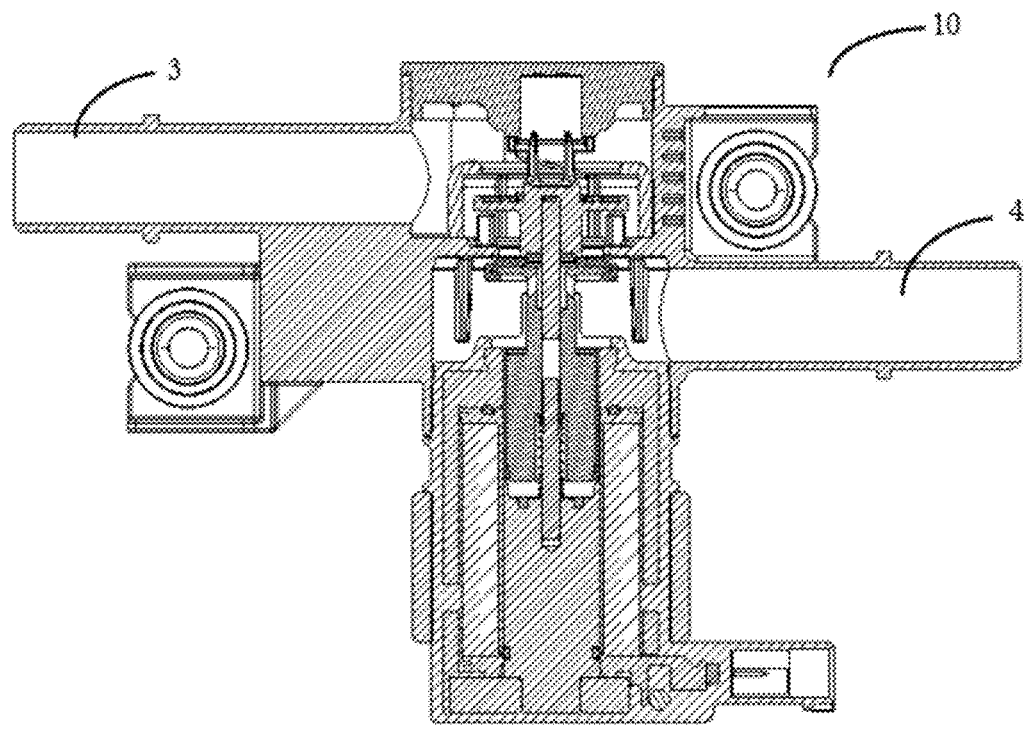
FIG. 6 shows cross-sectional view of a conventional fuel tank isolation valve in idle delivery condition.

FIG. 6 shows cross-sectional view of a conventional fuel tank isolation valve in idle delivery condition. The conventional fuel tank isolation valve is normally closed in the idle condition and the tank port is not connected to the canister port.

Figure 7:
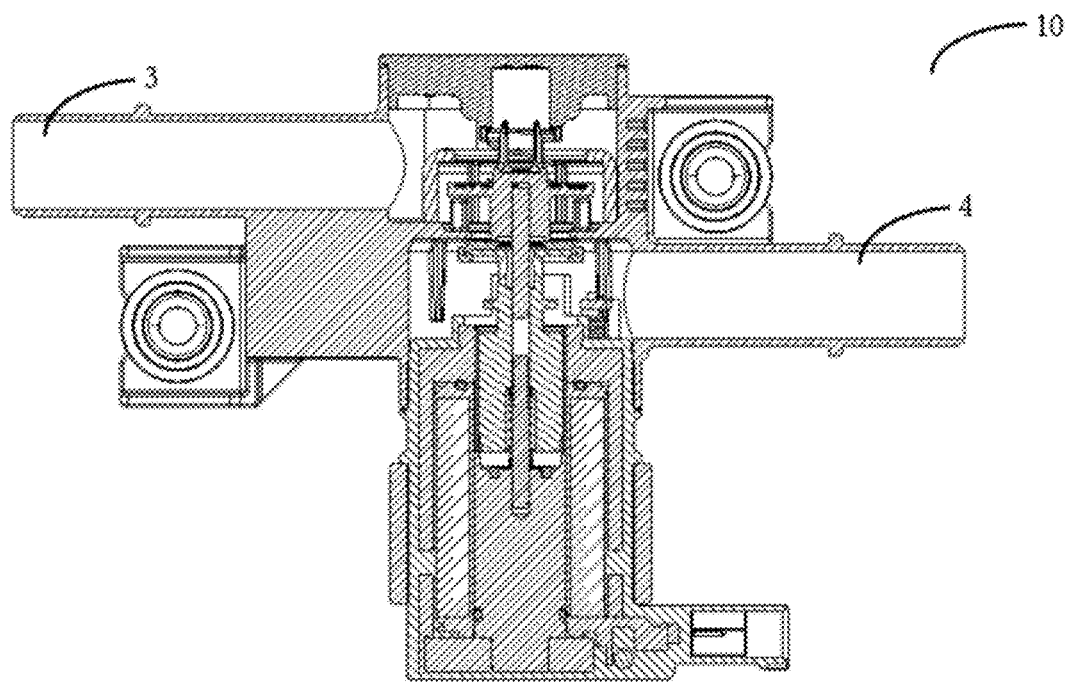
FIG. 7 shows cross-sectional view of the improved fuel tank isolation valve in idle delivery condition.

FIG. 7 shows cross-sectional view of the improved fuel tank isolation valve in idle delivery condition. The improved fuel tank isolation valve has a latch assembly with help of which the valve 10 it is normally open for one-time delivery and the tank port 4 is connected to the canister port 3. After first time electrical actuation, the latch assembly becomes non-functional.

Figure 8A:
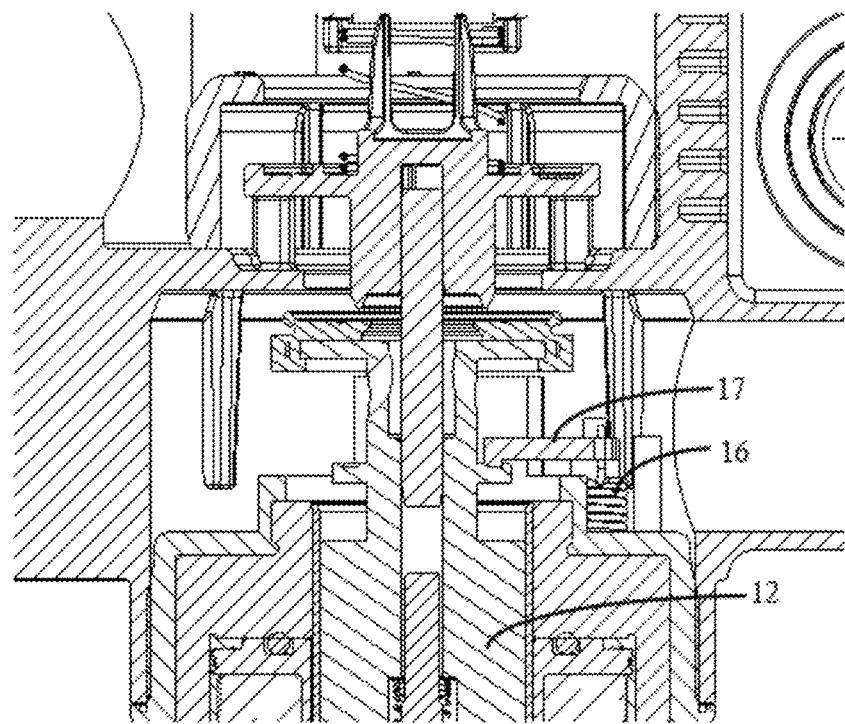
FIG. 8(a) and FIG. 8(b) shows cross-sectional view of the improved fuel tank isolation valve and moving core respectively in accordance with one of the embodiment of the present invention.
Figure 8B:
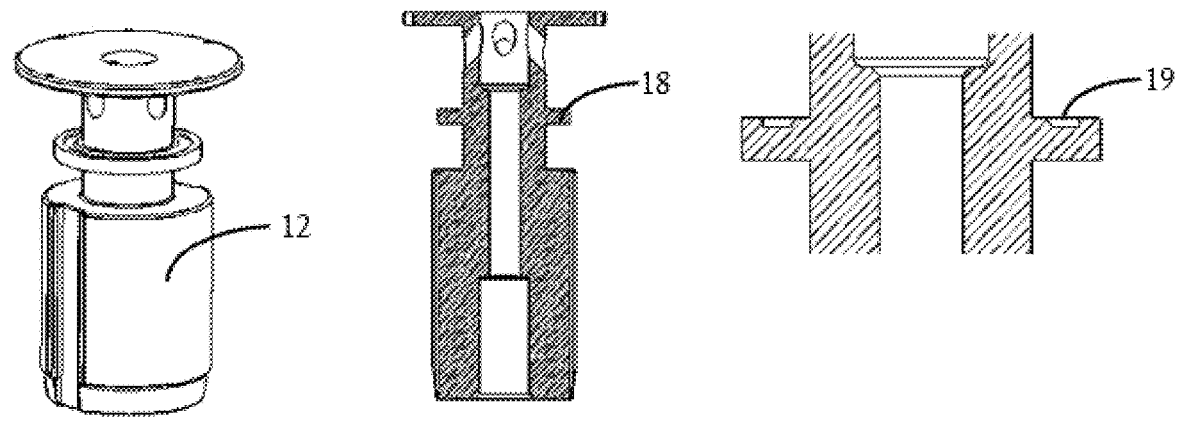

FIG. 8(a) and FIG. 8(b) shows cross-sectional view of the improved fuel tank isolation valve and moving core respectively in accordance with one of the embodiment of the present invention. The latch assembly comprises of a torsional spring 16 and a hinge 17 that locks the moving core 12 in axial direction to provide an intermediate latching position for single operation. The moving core 12 is modified such that it has an extruded ring 18 on its thin portion with an annular groove 19 on its upper surface in which a protrusion 20 provided at free end of the hinge 17 gets engaged.

Figure 8C:
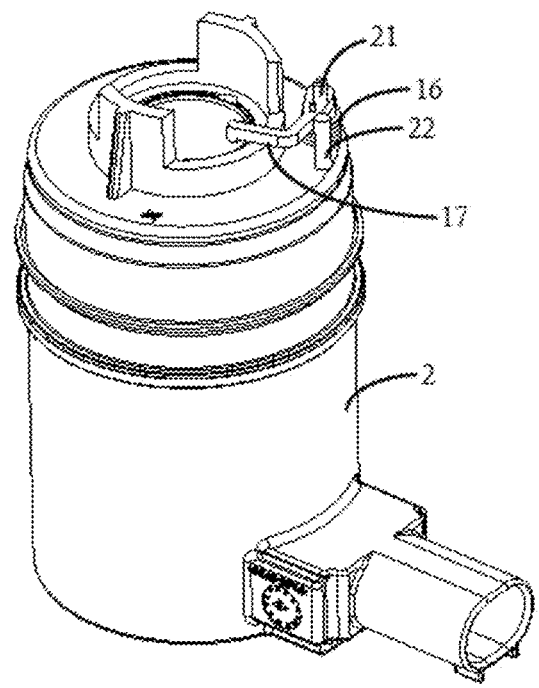
FIG. 8(c) shows the perspective view of the solenoid housing (2) in accordance with one of the embodiment of the present invention.

FIG. 8(c) shows the perspective view of the solenoid housing 2 in accordance with one of the embodiment of the present invention. On the top end of the solenoid housing 2, there is at least one protrusion 21 is provided for assembly of torsional spring 16 and hinge 17 and at least one protrusion 22 is provided that acts as a stopper for the hinge 17 in the idle condition.

Figure 8D:
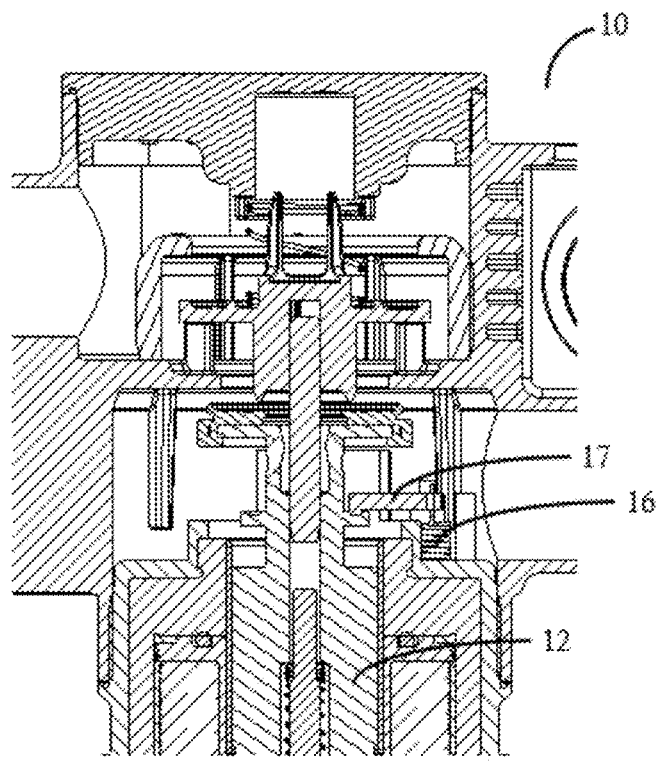
FIG. 8(d) and FIG. 8(e) shows the sectional and perspective view of the fuel tank isolation valve respectively in accordance with an embodiment of the present invention.
Figure 8E:
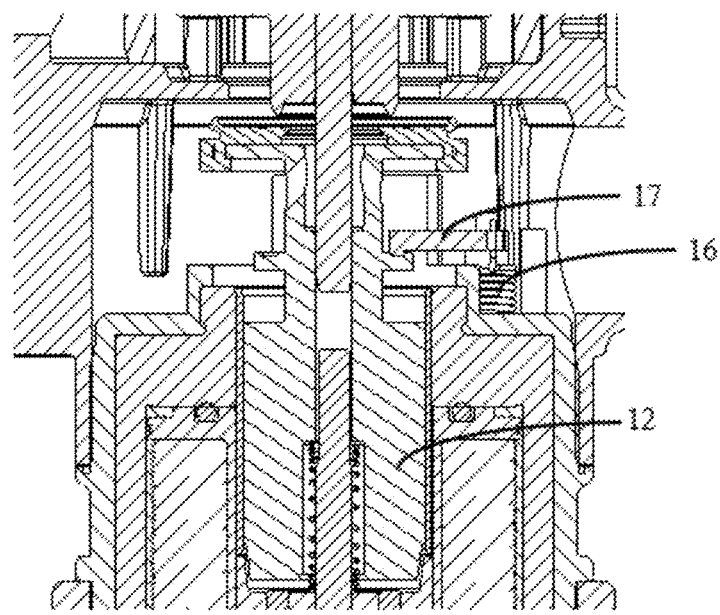

FIG. 8(d) and FIG. 8(e) shows the sectional and perspective view of the fuel tank isolation valve respectively in accordance with an embodiment of the present invention. If during the testing of the valve 10, the valve is actuated and the moving core 12 moves downward, then with help of an external tool the hinge 17 is pressed against the force exerted by the torsional spring 16 and valve 10 is made powerless to make the moving core 12 and hinge 17 snap lock with each other.

Figure 8F:
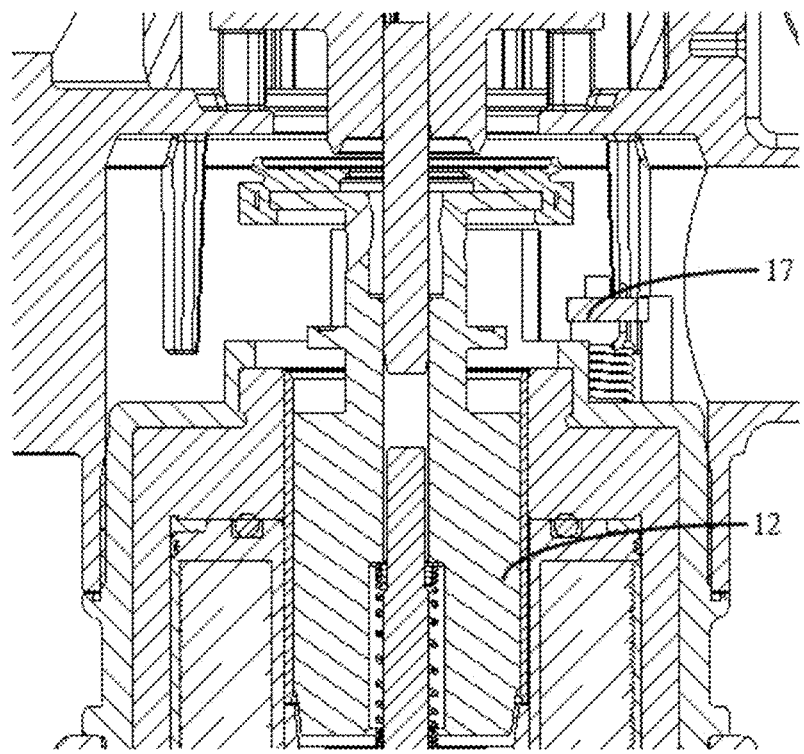
FIG. 8(f) shows the perspective view of the fuel tank isolation valve after installation in accordance with an embodiment of the present invention.

FIG. 8(f) shows the perspective view of the fuel tank isolation valve after installation in accordance with an embodiment of the present invention. After installation of the valve 10 and it is electrically actuated, the moving core 12 moves downwards and the snap lock with the hinge 17 is removed and the hinge 17 comes back to its original position and becomes non-functional.

Figure 9A:
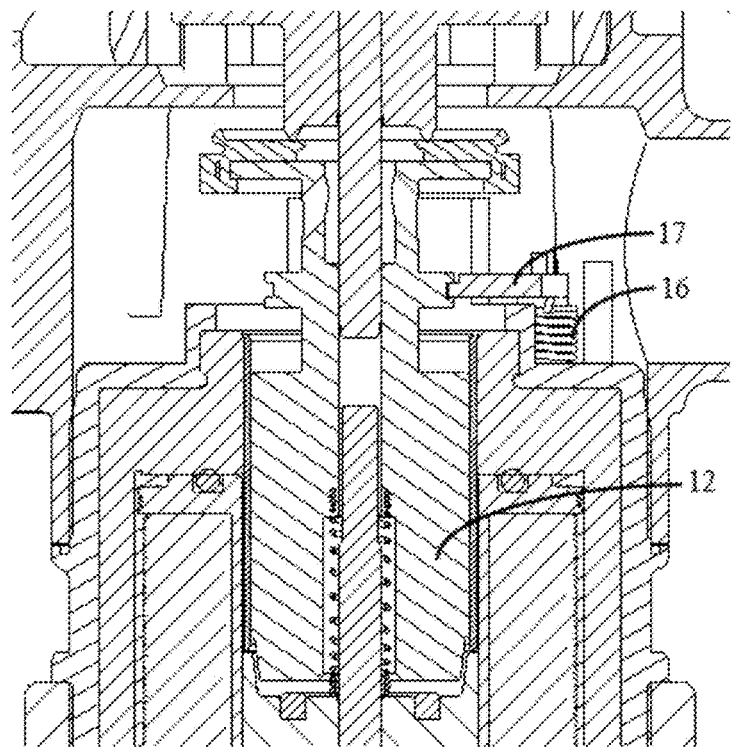
FIGS. 9(a), 9(b) and 9(c) shows cross-sectional view of the improved fuel tank isolation valve and moving cores respectively in accordance with one of the embodiment of the present invention.
Figure 9B:
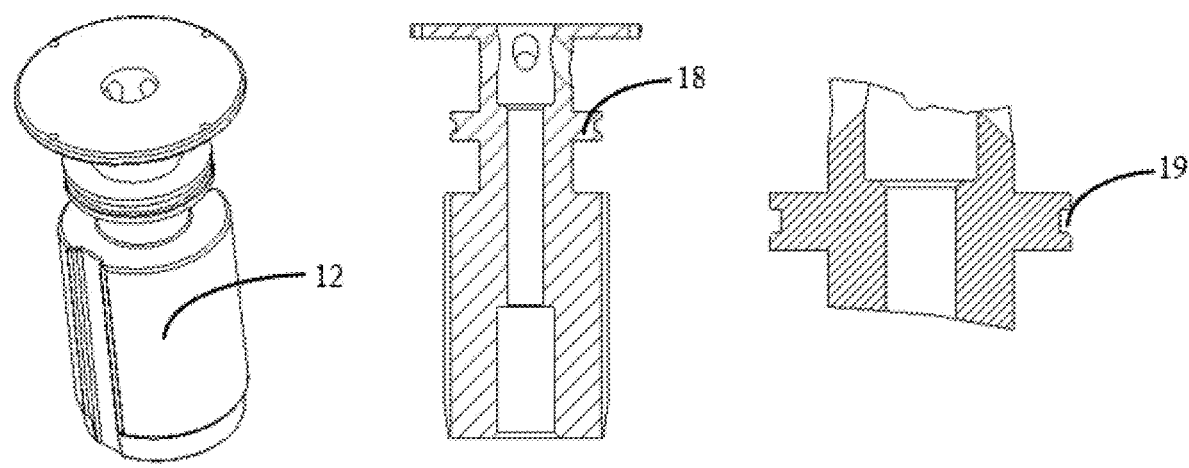
Figure 9C:
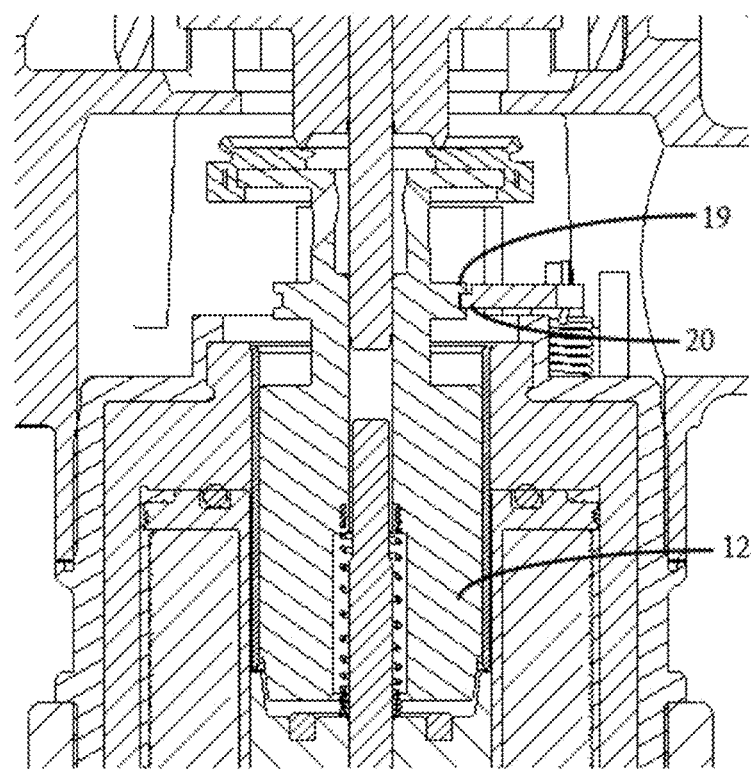

FIGS. 9(a), 9(b) and 9(c) shows cross-sectional view of the improved fuel tank isolation valve and moving cores respectively in accordance with one of the embodiment of the present invention. The latch assembly comprises of a torsional spring 16 and a hinge 17 that locks the moving core 12 in radial direction to provide an intermediate latching position for single operation. The moving core 12 is modified such that it has an extruded ring 18 on its thin portion with an annular groove 19 on its side surface in which a protrusion 20 provided at free end of the hinge gets engaged. FIG. 9(c) shows an alternate of moving core 12 modified such that the annular groove 19 is provided on the thin portion of the moving core 12 itself and the hinge 17 is elongated such that protrusion 20 at its free end gets engaged in the groove.

Figure 10A:
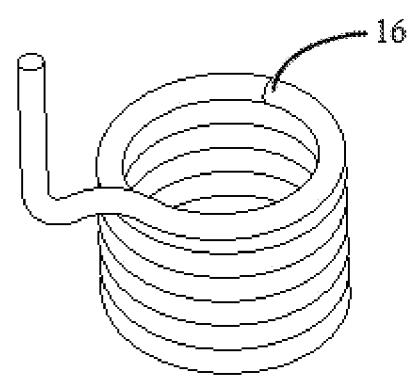
FIG. 10(a) and FIG. 10(b) shows the perspective view of the torsional spring and hinge in accordance with an embodiment of the present invention.
Figure 10B:
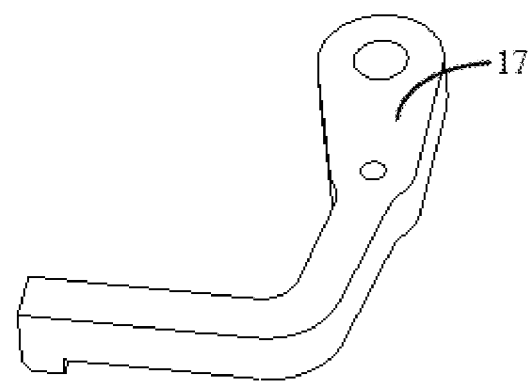

FIG. 10(a) and FIG. 10(b) shows the perspective view of the torsional spring 16 and hinge 17 in accordance with an embodiment of the present invention. The hinge 17 is having a hole so that it is inserted in the protrusion on the top end of the solenoid housing and an orthogonal arm having a protrusion at its free end for snap lock with the moving core.

Figure 11A:
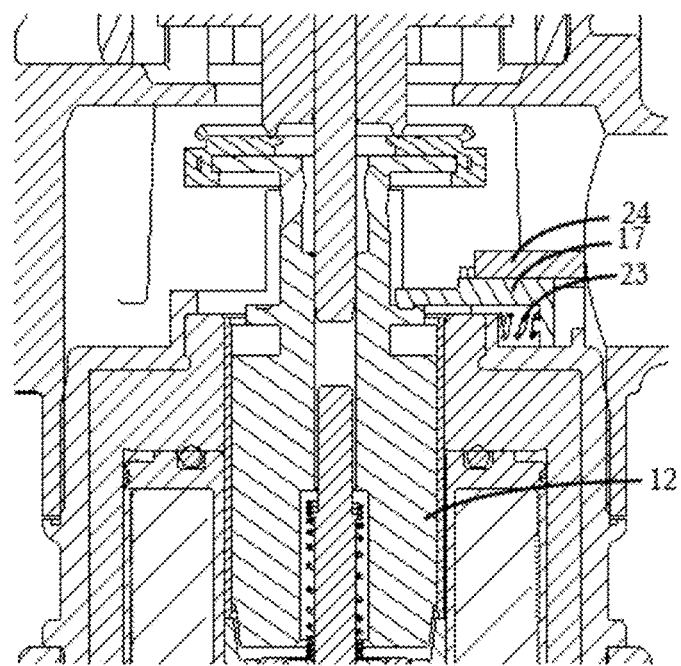
FIG. 11(a) and FIG. 11(b) shows cross-sectional view of the improved fuel tank isolation valve and moving core respectively in accordance with one of the embodiment of the present invention.
Figure 11B:
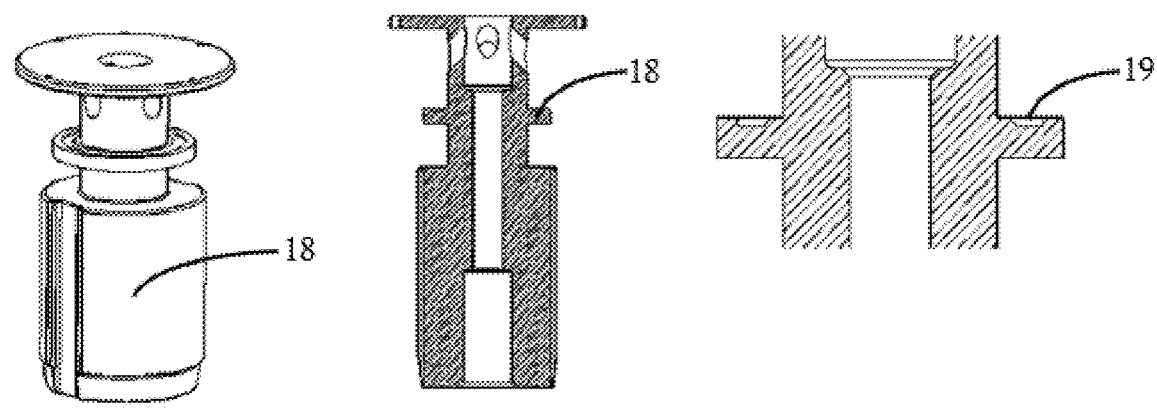

FIG. 11(a) and FIG. 11(b) shows cross-sectional view of the improved fuel tank isolation valve and moving core respectively in accordance with one of the embodiment of the present invention. Said latch assembly comprises of a compression spring 23, a cover 24 and a hinge 17 that locks the moving core 12 in axial direction to provide an intermediate latching position for single operation. The moving core 12 is modified such that it has an extruded ring 18 on its thin portion with an annular groove 19 on its upper surface in which a protrusion 20 provided at free end of the hinge 17 gets engaged using the compression spring 23 and fitted with the cover 24.

Figure 11C:
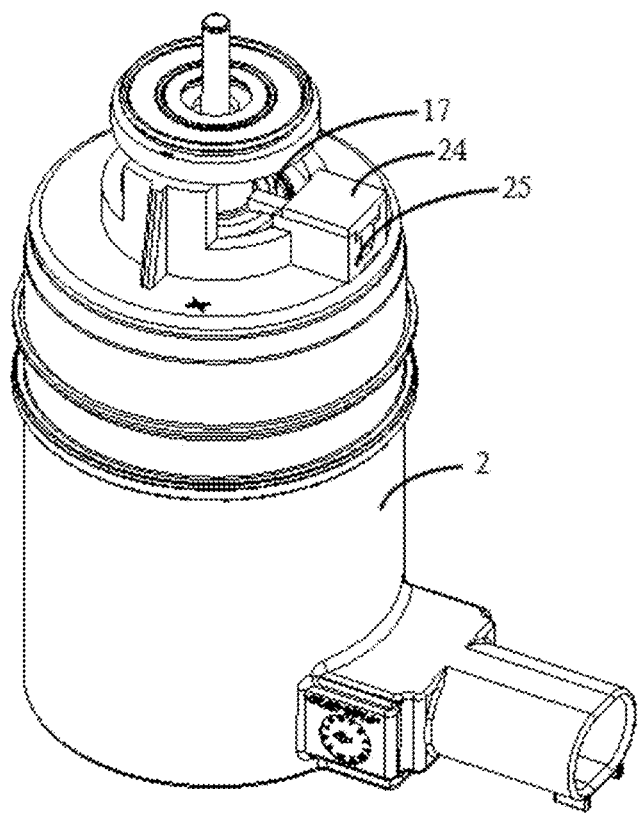
FIG. 11(c) shows the perspective view of the solenoid housing (2) in accordance with one of the embodiment of the present invention.

FIG. 11(c) shows the perspective view of the solenoid housing 2 in accordance with one of the embodiment of the present invention. On the top end of the solenoid housing 2, there is at least one protrusion 25 provided for guided movement of hinge 17 and the compression spring 23 is assembled in between this protrusion 25 with a cover 24 on the top.

Figure 11D:
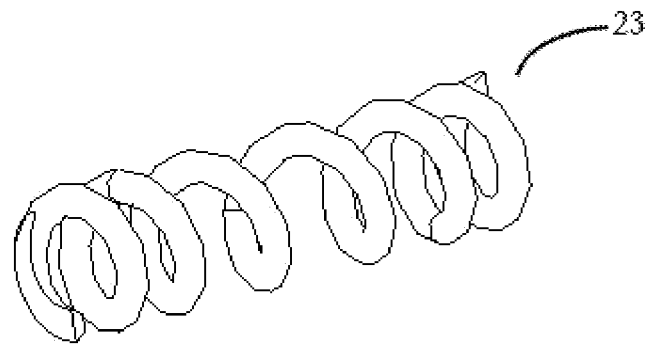
FIGS. 11(d), 11(e) and 11(f) shows the perspective view of the compression spring (13), hinge (17) and cover (24) in accordance with an embodiment of the present invention.
Figure 11E:
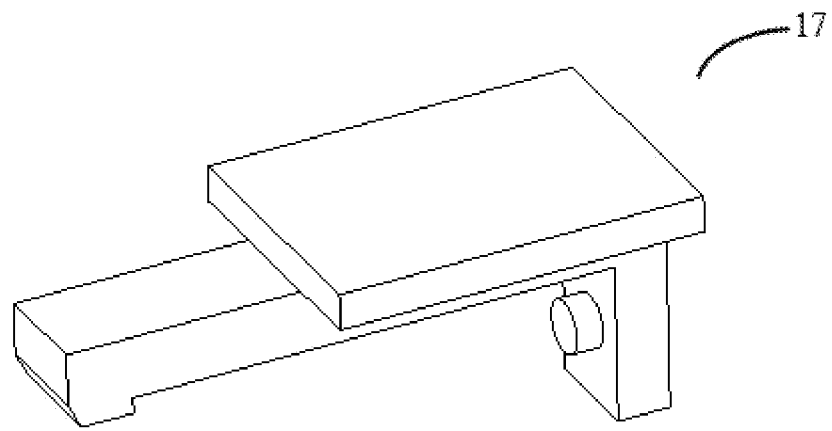
Figure 11F:
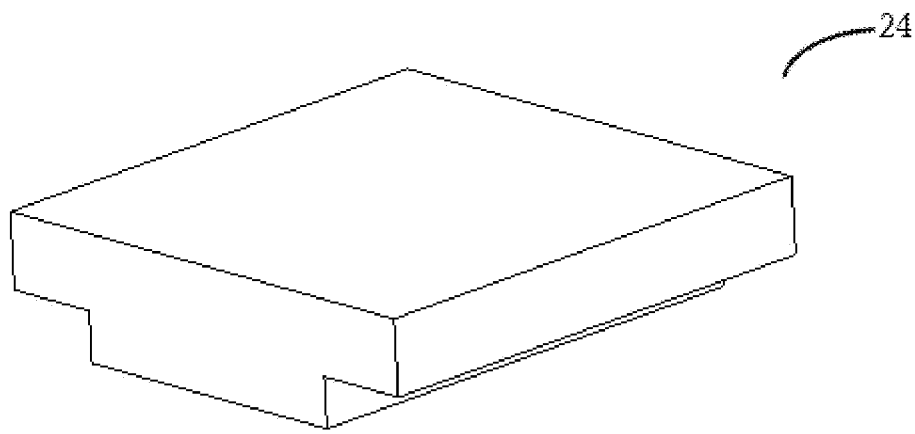

FIGS. 11(d), 11(e) and 11(f) shows the perspective view of the compression spring 23, hinge 17 and cover 24 in accordance with an embodiment of the present invention. The hinge 17 is having a pin that it is guided in the protrusion on the top end of the solenoid housing and a straight arm having a protrusion at its free end for snap lock with the moving core. The cover 24 gets fitted over the hinge 17 in the protrusion on the top end of the solenoid housing 2.

Figure 11G:
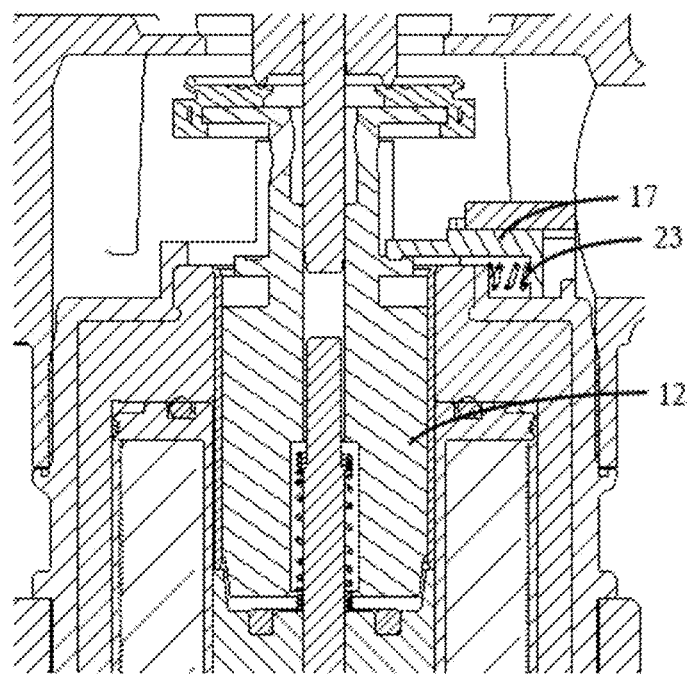
FIG. 11(g) shows the cross-sectional and perspective view of the fuel tank isolation valve in accordance with an embodiment of the present invention.

FIG. 11(g) shows the cross-sectional and perspective view of the fuel tank isolation valve in accordance with an embodiment of the present invention. If during the testing, the valve 10 is actuated and the moving core 12 moves downward, then with help of an external tool the hinge 17 is pressed by compressing the compression spring 23 and valve 10 is made powerless to make the moving core 12 and hinge 17 snap lock with each other to keep the valve 10 partially open for one-time delivery condition.

Therefore, the present invention provides an improved fuel tank isolation valve and various latch assembly arrangements to keep the valve partially open for one-time delivery i.e., provide intermediate latching for refuelling function to open fuel filling circuit without power connection provided to vehicle at that time.

We claim:

1. An improved fuel tank isolation valve (10) with intermediate position latching for single operation comprising:
    a) a valve housing (1) has a canister port (3), a tank port (4) and is fitted over a solenoid housing (2), the valve housing (1) includes a compression spring (5) fixed inside the valve housing (1) for performing OPR function, a seal sub assembly (6), a flow limiter (8), a sealing surface (9) and a shaft/plunger (7);
    b) solenoid housing (2) includes a solenoid (11), a moving core (12), a compression spring (13) for performing OVR function;
    wherein,
        said shaft (7) is assembled with seal sub-assembly (6) for OPR function for inline guiding of the flow limiter (8);
        said solenoid housing (2) on its top end has at least one latch assembly connected to provide a one-time powerless opening to perform the refueling at the time of vehicle assembly;
        the latch assembly comprises a torsional spring (16), a hinge (17), a compression spring (23), and a cover (24); and
        said latch assembly locks the moving core (12) in radial or axial direction to provide an intermediate latching position for single operation.

2. The improved fuel tank isolation valve (10) as claimed in claim 1, wherein said latch assembly for locking the moving core (12) in radial direction comprises of the torsional spring (16) and the hinge (17).

3. The improved fuel tank isolation valve (10) as claimed in claim 2, wherein the moving core (12) has an extruded ring (18) on its thin portion with an annular groove (19) on its upper surface in which a protrusion (20) provided at free end of the hinge (17) gets engaged.

4. The improved fuel tank isolation valve (10) as claimed in claim 2, wherein the moving core (12) alternatively has an extruded ring (18) on its thin portion with an annular groove (19) on its side surface in which a protrusion (20) provided at free end of the hinge (17) gets engaged.

5. The improved fuel tank isolation valve (10) as claimed in claim 2, wherein the moving core (12) alternatively has an annular groove (19) on its surface and the hinge (17) is elongated such that protrusion at its free end gets engaged in the groove (19).

6. The improved fuel tank isolation valve (10) as claimed in claim 2, wherein said solenoid housing (2) on the top end has at least one protrusion (21) provided for assembly of torsional spring (16) and hinge (17) and said protrusion (21) acts as a stopper for the hinge (17) in idle condition.

7. The improved fuel tank isolation valve (10) as claimed in claim 2, wherein said torsional spring (16) and hinge (17) are assembled in the solenoid housing (2) in idle condition such that the hinge (17) gets in contact with the protrusion (21).

8. The improved fuel tank isolation valve (10) as claimed in claim 7, wherein said moving core (12) has an extruded ring (18) on its thin portion with an annular groove (19) on its upper surface in which a protrusion (20) provided at free end of the hinge (17) gets engaged using the compression spring (23) fitted with the cover (24).

9. The improved fuel tank isolation valve (10) as claimed in claim 7, wherein said solenoid housing (2) on top end has at least one protrusion (25) for guided movement of hinge (17) and the compression spring (23) is assembled in between the protrusion (25) with the cover (24) on its top to keep the hinge (17) at its original position.

10. The improved fuel tank isolation valve (10) as claimed in claim 7, wherein said hinge (17) is pressed by compressing the compression spring (23) and the valve (10) is made powerless so that moving core (12) and hinge (17) snap lock with each other keeping the valve (10) partially open for one time delivery condition and the valve (10) becomes normally open for one time delivery condition.

11. The improved fuel tank isolation valve (10) as claimed in claim 2, wherein the torsional spring (16) is inserted in said protrusion (21) and said hinge (17) is mounted on it to press the hinge (17) against the torsional spring (16) and the valve (10) is made powerless open so that the hinge (17) and the moving core (12) are snap locked.

12. The improved fuel tank isolation valve (10) as claimed in claim 2, wherein the moving core (12) remain locked from returning to original position and made to stop at the intermediate position keeping the valve (10) partially open for one time delivery condition.

13. The improved fuel tank isolation valve (10) as claimed in claim 1, wherein said latch assembly for locking the moving core (12) in axial direction comprises of the compression spring (23), the cover (24), and the hinge (17).

* * * * *